United States Patent
Pedrido

(10) Patent No.: US 8,033,142 B2
(45) Date of Patent: Oct. 11, 2011

(54) METHOD FOR FABRICATING AN OPTICAL FIBER, PREFORM FOR FABRICATING AN OPTICAL FIBER, OPTICAL FIBER AND APPARATUS

(75) Inventor: Carlos Pedrido, Boudry (CH)

(73) Assignee: Silitec SA, Boudry (CH)

( * ) Notice: Subject to any disclaimer, the term of this patent is extended or adjusted under 35 U.S.C. 154(b) by 942 days.

(21) Appl. No.: 11/568,346

(22) PCT Filed: Feb. 22, 2005

(86) PCT No.: PCT/CH2005/000106
§ 371 (c)(1),
(2), (4) Date: Mar. 23, 2007

(87) PCT Pub. No.: WO2005/102947
PCT Pub. Date: Nov. 3, 2005

(65) Prior Publication Data
US 2007/0220924 A1   Sep. 27, 2007

(30) Foreign Application Priority Data

Apr. 27, 2004   (WO) ................ PCT/CH2004/000261

(51) Int. Cl.
*C03B 37/028* (2006.01)
*C03B 37/00* (2006.01)
(52) U.S. Cl. ............................................ 65/412; 65/376
(58) Field of Classification Search .................... 65/385, 65/393, 408–409, 412, 417–419, 423, 427–428, 65/442
See application file for complete search history.

(56) References Cited

U.S. PATENT DOCUMENTS
2,980,957 A   4/1961 Hicks
(Continued)

FOREIGN PATENT DOCUMENTS
DE   39 21 489 A   1/1991
(Continued)

OTHER PUBLICATIONS
Towaga et al. JP 09-124332 online translation as provided by http://dossier1.ipdl.inpit.go.jp/AIPN/aipn_call_transl.ipdl?N0000=7413&N0120=01&N2001=2&N3001=1997-124332&Ntt3=machineV13&Ntt4=industryV13&Ntt5=gakujutsuV13&Ntt6=&Ntt7=&Ntt8=&Ntt9=&Ntt10=&Ntt11=&Ntt12= on Mar. 11, 2010.*

(Continued)

*Primary Examiner* — Matthew Daniels
*Assistant Examiner* — Jodi F Cohen
(74) *Attorney, Agent, or Firm* — Oliff & Berridge, PLC

(57) ABSTRACT

The method for fabricating an optical fiber comprises the steps of inserting a primary optical fiber preform (11) having a first primary axis (x1) and an outer surface (111) into an overcladding tube (12) having a second primary axis (x2) and an inner surface (120), so that said outer surface and inner surface define an interior space (15); holding the primary preform (11) in a centrally inserted position within the overcladding tube (12) with said first and second primary axes (x1, x2) in substantial alignment with each other; supplying overcladding grain (13) into the interior space (15) that is limited at the lower end of the overcladding tube (12) by means of a closure (125); generating a condition of reduced pressure within the interior space (15) that is limited at the upper end of the overcladding tube (12) by means of an adjoiner (3), which holds the primary optical fiber preform (11) and the overcladding tube (12) in position; and heating the unprocessed secondary preform (1), that consists of the primary preform (11), the overcladding tube (12) and the overcladding grain (13), at its lower end to a softened state and simultaneously or subsequently drawing an optical fiber therefrom.

20 Claims, 10 Drawing Sheets

U.S. PATENT DOCUMENTS

| | | | |
|---|---|---|---|
| 4,820,322 A | 4/1989 | Baumgart et al. | |
| 6,047,568 A | 4/2000 | Campion | |
| 6,334,338 B1 | 1/2002 | Mandich et al. | |
| 6,519,974 B1 | 2/2003 | Oh et al. | |
| 6,626,011 B2 * | 9/2003 | Chiquet et al. | 65/388 |
| 2004/0050110 A1 * | 3/2004 | Berkey et al. | 65/393 |
| 2005/0204780 A1 * | 9/2005 | Moridaira et al. | 65/407 |
| 2007/0214841 A1 | 9/2007 | Pedrido | |

FOREIGN PATENT DOCUMENTS

| | | |
|---|---|---|
| EP | 0 553 868 A1 | 8/1993 |
| EP | 0 695 003 A | 1/1996 |
| JP | 58 104031 A | 6/1983 |
| JP | 58 151336 A | 9/1983 |
| JP | 61 132535 A | 6/1986 |
| JP | 09-124332 * | 5/1997 |
| JP | 09 124332 A | 5/1997 |
| WO | 03/093884 A1 | 11/2003 |

OTHER PUBLICATIONS

Handbook of Photonics, Mool C. Gupta Editor in Chief, ISBN0-8493-8909-7 CRC Press, LLC. Boca Raton, FL, TA1520.H37 1996, pp. 445-449.

* cited by examiner

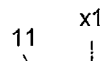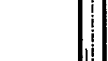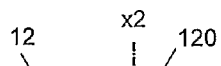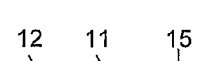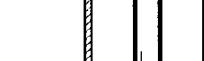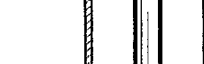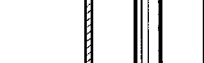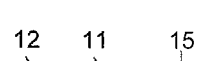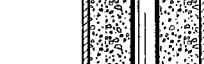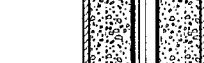

Fig. 5
Fig. 6
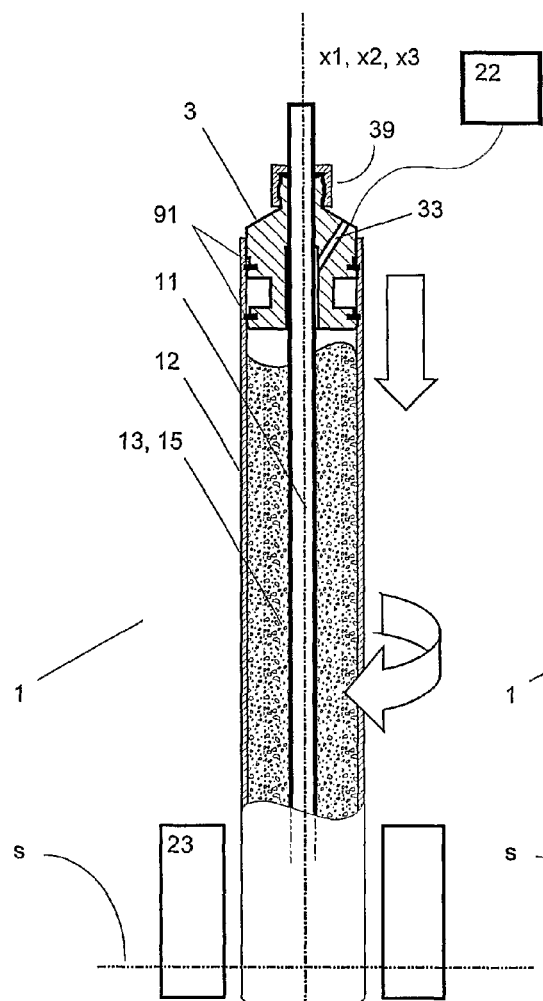
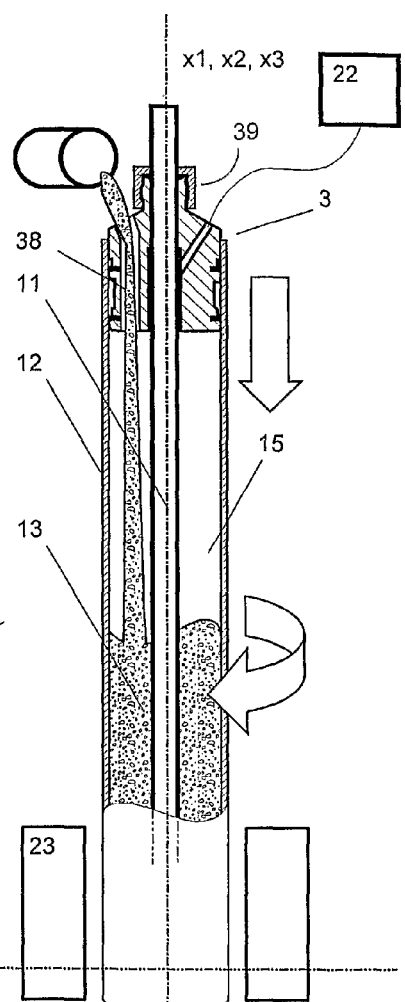
Fig. 5a
Fig. 6a
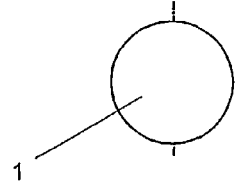
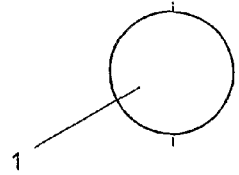

Fig. 15
Fig. 16
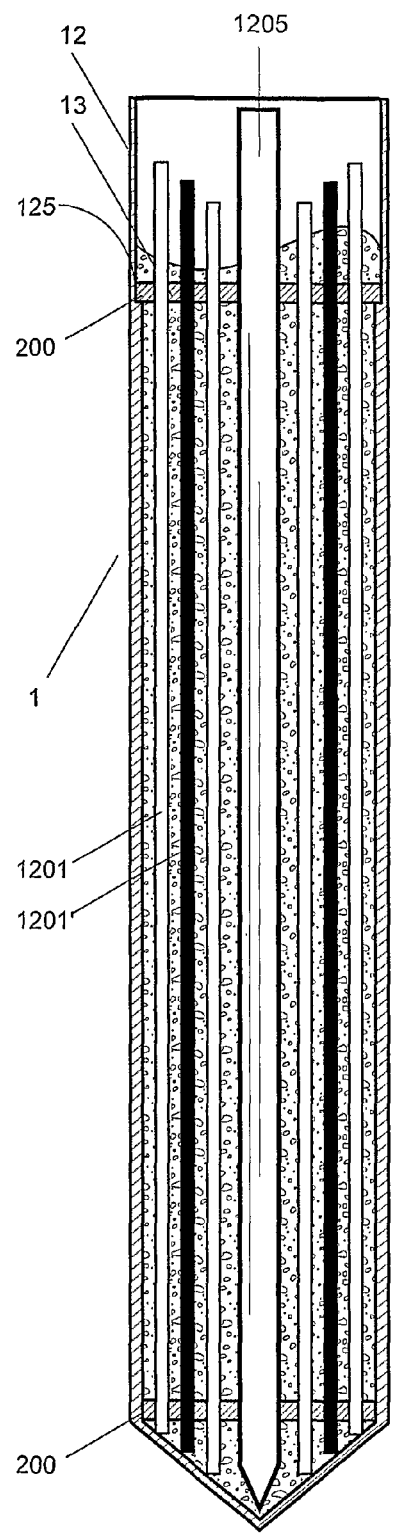
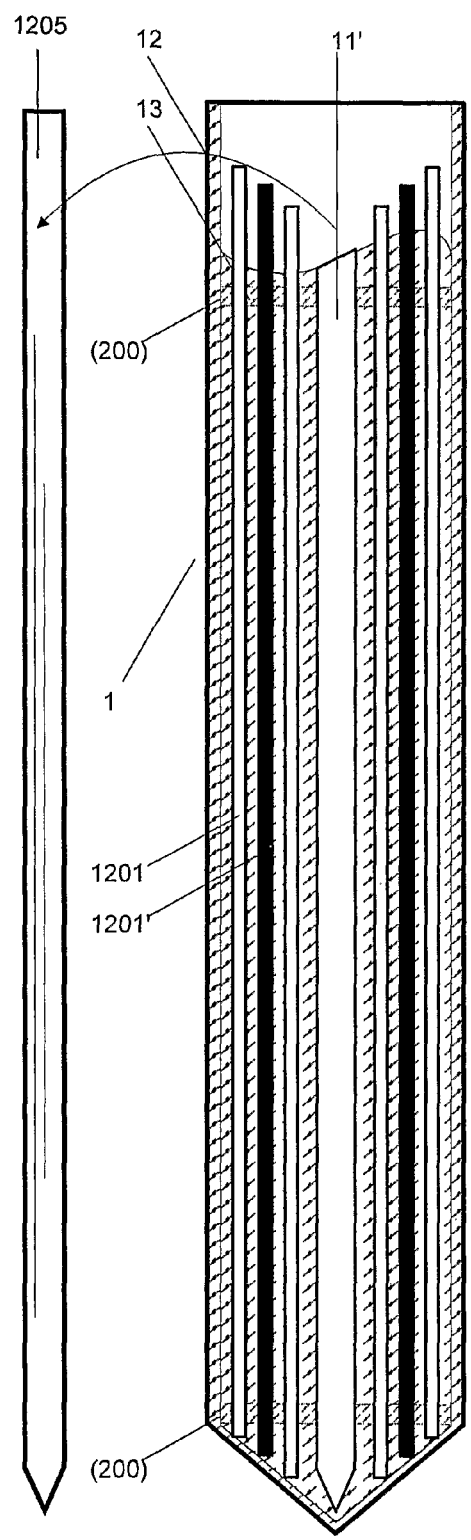

METHOD FOR FABRICATING AN OPTICAL FIBER, PREFORM FOR FABRICATING AN OPTICAL FIBER, OPTICAL FIBER AND APPARATUS

The present invention relates to a method and an apparatus for fabricating an optical fibre such as a Photonic Crystal Fibre, and to a preform used for fabricating an optical fibre as well as to optical fibre fabricated according to said method.

Fabrication of optical fibres, such as the fibres currently used in ultra high speed data communication networks, is described in [1], Mool C. Gupta, Handbook of PHOTONICS, CRC Press, 1997 Boca Raton, chapter 10.7, pages 445-449. Main process steps of optical fibre fabrication are fabricating a glass blank (below called preform), drawing the fibre from the preform and coating the fibre with a material that protects the fibre from handling and from environmental influences.

According to [1], there are basically three methods to form the preform. The modified chemical vapor deposition process (MCVD), the outside vapour deposition process (OVD) and the vapour-axial deposition process (VAD).

In the drawing process, the preform is fed from above into the drawing portion of the furnace while being drawn from the bottom using tractors. The fibre is then wound onto a drum while being monitored for tensile strength. The temperature during draw is on the border of 2000° C. After exiting the furnace the fibre is coated with a UV-curable coating before winding on the drum.

As described in [2], U.S. Pat. No. 6,519,974B1, the MCVD method has certain advantages over the other methods. In the MCVD process, successive layer of $SiO_2$ and dopants, which include Germanium, phosphorous and fluorine, are deposited on the inside of a fused silica tube by mixing the chloride vapors and oxygen at a temperature in the order of 1800° C. In the layer deposition process the cladding layers are laid down first, and then the layers that will form the core are deposited. After deposition of the layers, the internally layered quartz tube is heated in the presence of $Cl_2$ and He so as to form a compact quartz rod.

As further stated in [2], the MCVD method, used by itself, has the inherent limitation that it is not suitable to make preforms of more than 25 mm in diameter. In order to overcome this limitation, MCVD is often practiced with a so-called overcladding method, which allows fabrication of relatively large preforms and thus improves productivity for the fibre fabrication process. Conventional overcladding involves, in general terms, placing a rod preform inside a tube made of a suitable overcladding material, fusing the rod and tube together to form a secondary preform, and drawing from the secondary preform an optical fibre comprising a core enclosed within a cladding layer. Thus, a high-productivity implementation of the MCVD method requires three essential steps: preparing a primary optical fibre preform by internal deposition, overcladding the primary optical fibre preform to obtain a secondary optical fibre preform, and finally drawing an optical fibre from the secondary optical fibre preform.

In [2], it has been found that carrying out these three steps separately requires
a) substantial amounts of time and consequently has a negative effect on productivity;
b) a large amount of oxygen or hydrogen for the step of overcladding the primary optical fibre preform; and
c) application of a relatively large amount of heat for the overcladding step, if the primary optical fibre preform is relatively large.

To overcome these disadvantages a combination of the overcladding and drawing steps was proposed e.g. in [3], U.S. Pat. No. 2,980,957. The method disclosed in [3] comprises the steps of creating between a core rod and a thereto concentrically arranged overcladding tube a high vacuum prior to the drawing stage and further a controlled low vacuum in order to controllably counteract the drawing forces and cause the tubular member to progressively collapse into the space between the core rod and the overcladding tube. One problem in combining the fusing and drawing stages has been to control the application of vacuum with sufficient precision that the finished optical fibre has sufficient strength and optical quality for modern communications applications.

Another aspect addressed in [2] is the proper alignment of the core rod and the overcladding tube. A method has been disclosed in [4], U.S. Pat. No. 4,820,322, that allows the fabrication of a strong fibre with concentric core and cladding, that uses a vacuum to promote collapse of the overcladding tube, and that can be practiced either in a separate manufacturing phase or in a continuous process combined with drawing of the fibre. As stated in [2] the approach disclosed in [4] has a limit on the gap between the rod and the overcladding tube; the tube inside diameter cannot exceed the rod diameter by more than a certain amount. Furthermore, the embodiment combining collapsing the tube and drawing the fibre does not use an affirmative means to center the rod in the tube, relying instead for concentricity on inherent self-centering forces thought to be present as the fibre is drawn from the tip of the rod-and-tube preform.

To improve the techniques described above a method has been proposed in [2] that allows drawing of an optical fibre from a rod-and-tube preform while simultaneously fusing the rod and the overcladding tube. This rod-in-tube approach employs a low-intensity vacuum source that permits fine adjustment of the differential pressure. It also provides for controlled alignment of the core rod and the overcladding tube to ensure that the desired circumferential uniformity of the cladding layer in the drawn fibre is achieved. The low-intensity vacuum is achieved by introducing a flow of gas into an adjoiner that holds a primary optical fibre preform having a first primary axis and an outer surface and an overcladding tube having a second primary axis and an inner surface defining an interior space, coaxially aligned together as a secondary preform assembly. The flow of gas through a channel in the adjoiner generates a condition of reduced pressure in accordance with Bernoulli's theorem, and therefore partially evacuates the space between the overcladding tube and the primary optical fibre preform. The flow rate through channel will determine the extent to which the gas pressure in the space is reduced.

According to [2], the main concern with the realisation of rod-in-tube processes is focussed on alignment procedures and the application of a precisely controlled vacuum. However, besides these known main concerns, costs for the production of high quality optical fibre from a rod-and-tube preform are a continuous concern.

It would therefore be desirable to provide an improved method and an apparatus that allow fabricating high quality optical fibre from a rod-and-tube preform.

It would be desirable in particular to provide a method that allows fabricating high quality optical fibre from a rod-and-tube preform at significantly reduced cost.

Still further it would be desirable to provide a method that allows a reduction of the requirement of precision in alignment of rod and tube of the rod-and-tube preform as well as a reduction of the requirement of precision for controlling the vacuum for sequential or simultaneous preform fusing and fibre drawing.

It would further be desirable to create a rod-and-tube preform, that can be used with the inventive method, as well as high quality optical fibre drawn from said rod-and-tube preform.

It would further be desirable to create a rod-and-tube preform that allows modification of the properties of the optical fibre drawn from said rod-and-tube preform with reduced effort.

However besides traditional fibres which are derived from "single rod and single tube" preforms, so called Photonic Crystal Fibres (PCF) emerged in recent years which rely on a new mechanism for guiding light.

As described in [8], U.S. Pat. No. 6,845,204, traditional waveguides operate by guiding the electromagnetic field (the light or the photons) through a physical effect, which is known as total internal reflection. By using this fundamental effect, the propagation (or loss) of optical power in directions perpendicular to the waveguide axis is reduced. In order to obtain total internal reflection in these waveguides, which are often fabricated from dielectric materials (in optical fibres) or semiconductors (in integrated optics), it is necessary to use a higher refractive index of the core compared to the refractive index of the surrounding cladding.

During the past ten years, however, the development within the area of new materials has opened up the possibilities of localisation of light or control of electromagnetic fields in cavities or waveguides by applying the so-called photonic band gap (PBG) effect. The PBG effect may be introduced by providing a spatially periodic lattice structure, in which the lattice dimensions and applied materials are chosen in such a way that electromagnetic field propagation is inhibited within the gap in certain frequency intervals and in certain directions.

By locally breaking the periodicity of a photonic crystal, a spatial region with optical properties different from the surrounding bulk photonic crystal can be created. If such a defect region supports modes with frequencies falling inside the forbidden gap of the surrounding full-periodic crystal, these modes will be strongly confined to the defect. This is the principle on which the operation of the PBG guiding fibres relies, namely a complete out-of-plane 2D band gap exhibited by the photonic crystal cladding, and a correctly designed defect, forming a spatial region to which very strong transverse confinement car be achieved. For this defect region to exhibit optical properties different from the surrounding periodic structure (i.e., be able to support a localised mode) it is important to notice that it is not a requirement that the defect region, normally the core of the Photonic Crystal Fibre, has a higher index than its surroundings. Hence Photonic Crystal Fibres may comprise a hollow core or a solid core.

Compared to traditional fibres, Photonic Crystal Fibres comprise a complex structure. Photonic Crystal Fibres typically have a core region extending along the longitudinal direction, a cladding region extending along the longitudinal direction, said cladding region comprising an at least substantially two-dimensionally periodic structure comprising primary, elongated elements each having a centre axis extending in the longitudinal direction of the waveguide. The primary elements having a refractive index being lower than a refractive index of any material adjacent to the elongated elements.

Hence, the cladding forms a dielectric confinement region surrounding the core about the waveguide axis. Based on the band gap-effect, the confinement region guides electromagnetic radiation in at least a first range of frequencies along the waveguide axis. Thus, the light is trapped in the core, not by total reflection, but by the band gap-effect exhibited by the cladding that acts like an insulator for the light.

The periodic structure, that contains at least one sort of elongated structural elements, may be defined in various ways in order to obtain a desired band gap or a plurality of band gaps with a desired dimension.

Geometrical forms and sizes as well as refractive indexes of primary, secondary or further elongated elements typically differ from one another.

Further, according to [9], U.S. Pat. No. 6,625,364, it has been recognized that designing a photonic crystal fibre with a large core radius (e.g., larger than about twice the wavelength of the guided radiation) leads to many desirable properties. For example, the fraction of energy outside of the core for a guided mode in a photonic crystal fibre scales inversely with the cube of the core radius. Accordingly, radiation and dissipation losses associated with the dielectric confinement layers can be made very small by increasing the core radius. Moreover, because the confinement mechanism is not based on total internal reflection (TIR), the core material is not limited to a material having a relatively high index. Thus, the core material can be selected to minimize losses and nonlinearities. For example, the fibre may have a hollow core. Furthermore, confinement in the core is further improved by selecting materials for the layers (or regions) outside the core to have a large contrast in refractive index. Such contrasts are possible because the large core radius makes dissipation by the outside layers (or regions) less of an issue and thus the constituent materials of the outside layers (or regions) can be selected more on the basis of providing the desired index contrast, than on absorption losses.

As a consequence, for a manufacturer, it is important that preforms with complex structures can be set up and produced with minimal efforts and cost; bearing in mind that a further optimised structure or even a multi core structure could be proposed next day.

Still further, particularly for complex structures it is important that undesired voids are avoided (see [10], U.S. Pat. No. 6,698,249) while desired elongated voids are precisely realised, in order to avoid bandgap gradients.

Today, some preforms are made by stacking hundreds of capillary tubes and rods by hand into a structure with the appropriate pattern of holes. A hollow core is made by replacing one or more of the capillary tubes by a hollow tube with a significantly larger diameter. This preform is then introduced into the furnace of a fibre drawing tower where it is fused together and drawn to a size of 1-10 mm. Then a sleeve tube is added before it is drawn into the final dimensions. With this method, which is applied by Crystal Fibre A/S, the production of larger preforms involves considerable efforts.

Since the PBG-effect, which is the fundamental element of the low-index guiding property, is obtained by the periodicity of the cladding structure, only a very limited number of periods is necessary in order to confine the electromagnetic field, and it will, according to [8], be possible to use conventional overcladding of the part of the preform that contains the periodicity. Hence known overcladding techniques, e.g. said sleeving, can be applied.

As an alternative to the conventional overcladding approach, in [8] another approach is suggested, in which the fibre surrounding core area is constructed by bundling capillary tubes into a close-packed arrangement according to the preferred design of the periodic cladding region. Outside of this periodic region with the capillary tubes, which have to be fixed in position, the outer fibre structure (corresponding to an outer cladding region) could be formed by packing of thinner glass rods, which could be mechanically shaken into place. When the preform then later is drawn into a fibre, the outer cladding structure is melted together to form a (near) solid outer cladding. The requirement for the outside placement of thin glass rods is that the surface tension due to an uneven distribution outside the periodic part of the fibre, do not result in a significant deformation of the periodicity. However in view of the complex structures mechanically shaking the fine capillary tubes involves the risks of cracking tubes, leaving voids open or disturbing the periodic structure.

Since Photonic Crystal Fibres with new functionalities may be fabricated by introducing regions within the fibres with special doping materials, or even materials that deviates significantly from the fibre basis material (e.g., glass, or polymers); the fabrication process may comprise the introduction of thin rods of doped (or different) material at well-defined locations in the closely packed, periodic basis material structure. Alternatively, some of the capillary tubes could be made from a doped material, or the preform (or parts of it) could even be placed in solutions of materials that could diffuse or bind to the basis material rods and tubes. Since specific parts of the preform could be treated individually before further stacking or alternative processing would continue, this approach allows for a very high degree of flexibility.

It would therefore further be desirable to provide an improved method and an apparatus that allow fabricating high quality Photonic Crystal Fibres from a corresponding preform.

Further, it would be desirable to provide a method that facilitates production of preforms for Photonic Crystal Fibres and that allows production of larger preforms.

It would be desirable in particular to provide a method that allows realising complex structures accurately with tubes and rods that can be selected for optimal performance of the produced Photonic Crystal Fibres, while neglecting geometrical dimensions that were essential with known methods for obtaining the desired periodical structures.

Still further it would be desirable to provide a method that allows independent selection and placement of structural elements.

It would further be desirable to create preforms, that can be used with the inventive method in order to draw high quality Photonic Crystal Fibres.

SUMMARY OF THE INVENTION

The above and other objects of the present invention are achieved by a method according to claim 1 or 2, a preform according to claim 14, an optical fibre according to claim 18 and an apparatus according to claim 19.

The method for fabricating an optical fibre according to claim 1 comprises the steps of:
 inserting a primary optical fibre preform having a first primary axis and an outer surface into an overcladding tube having a second primary axis and an inner surface, so that said outer surface and inner surface define an interior space;
 holding the primary preform in a centrally inserted position within the overcladding tube with said first and second primary axes in substantial alignment with each other;
 supplying overcladding grain into the interior space that is limited at the lower end of the overcladding tube by means of a closure;
 generating a condition of reduced pressure within the interior space that is limited at the upper end of the overcladding tube by means of an adjoiner, which holds the primary optical fibre preform and the overcladding tube in position; and
 heating, by means of a furnace preferably in the range of 2100° C. to 2250° C., the unprocessed secondary preform, that consists of the primary preform, the overcladding tube and the overcladding grain, at its lower end to a softened state and simultaneously drawing an optical fibre therefrom or
 heating, by means of a furnace, the unprocessed secondary preform, that consists of the primary preform, the overcladding tube and the overcladding grain, substantially over its entire length in order to obtain a processed secondary preform, from which an optical fibre is drawn in a subsequent process stage.

The method for fabricating a Photonic Crystal Fibre according to claim 2 comprises the steps of:
 inserting elongated structural elements, having first primary axes and outer surfaces and being arranged in an at least substantially two-dimensionally periodic structure, into an overcladding tube having a second primary axis and an inner surface, said outer surface and inner surface defining an interior space;
 holding the structural elements with the first primary axes in parallel to the second primary axis of the overcladding tube;
 supplying overcladding grain into the interior space that is limited at the lower end of the overcladding tube by means of a closure;
 generating a condition of reduced pressure within the interior space that is limited at the upper end of the overcladding tube preferably by means of an adjoiner; and
 heating, by a furnace, the produced preform with the elongated structural elements, the overcladding tube and the overcladding grain, at its lower end to a softened state and simultaneously drawing an optical fibre therefrom, or
 heating, by a furnace, the produced preform with the elongated structural elements, the overcladding tube and the overcladding grain, over its entire length in order to obtain a processed preform, from which an optical fibre is drawn in a subsequent process stage.

Due to the thermal energy provided by the furnace and due to the established difference of pressures that are present in and outside the preform, the overcladding tube will collapse and press the molten overcladding grain onto the primary preform or the structural elements. Since the primary preform is also a structural element there is basically no difference between the methods of claim 1 and 2.

The overcladding material of the overcladding tube and the overcladding grain will form a practically homogeneous layer that adjoins the primary preform in the same manner as the thick overcladding tube does, when it collapses, in conventional rod-and-tube applications, as described for example in [2].

Fusing of the secondary preform and fibre drawing can be performed simultaneously as with the method described in [2]. However the unprocessed secondary preform can also be processed in a preliminary process stage in order to obtain a processed secondary preform from which an optical fibre can be drawn in a subsequent process stage at the present or another process site.

The present invention however yields numerous advantages over the prior art mentioned above:

The known method of producing a secondary preform by sleeving an overcladding tube with thick walls over a primary preform is abandoned. Instead an overcladding tube with thin walls is used and the interior space between the primary preform and the inner surface of the overcladding tube is filled with silica grain. Consequently the effort and costs for the production of the overcladding preform with thick walls are avoided. Instead of a costly silica tube with thick walls, silica grain can be used.

Due to the mobility of the overcladding grain, the interior space or gap between the outer surface of the primary preform and the inner surface of the overcladding tube is evenly filled with the silica grain, so that a misalignment between the primary preform and the overcladding tube. Besides the elimination of alignment problems the control of the pressure reduction is less critical, since the overcladding tube is not collapsing uncontrolled into a free gap but pressing steadily onto the supporting grain.

The inner diameter of the thin-walled overcladding tube is preferably selected at least 1.5 times larger than the outer diameter of the primary preform and more than 10 times larger than its wall diameter. However, in practice any dimensions can be realised, that are supported by the mechanical strength of the related elements.

Further the overcladding tube is preferably supplied with a conically formed closure at its lower end, so that the walls of the overcladding tube and the primary preform meet at their lower end and silica grain can be filled into the interior space. Since the primary preform in a preferred embodiment also comprises a conical form at its lower end, the alignment procedures are significantly facilitated.

The overcladding grain, which consists of particles with a small diameter, e.g. a powder, is inserted into the interior space before the adjoiner is mounted or after the adjoiner is mounted, through a channel provided therein.

The overcladding grain may be a pure or doped synthetic silica powder that may be selected according to the desired properties of the fabricated fibre. A method of manufacturing a silica powder using a sol-gel technique is described in [6], U.S. Pat. No. 6,047,568. Further sol-gel techniques, for achieving higher drawing forces and reducing breakage risks during the drawing process are described in [7], U.S. Pat. No. 6,334,338. Hence the inventive method also provides a high flexibility that allows meeting the customer's demands within short notice.

Also in view of the production of Photonic Crystal Fibres the present invention yields significant improvements over the prior art.

Since the axes of the elongated structural elements, whose ends form the two-dimensional periodic structure, may be relatively far apart, large spatial gaps can be filled cost efficiently with grain, thereby avoiding thick walled tubular structural elements.

Further, for all two-dimensional periodic structures that relate to a desired band gap, identical structural elements may be applied.

Alignment and holding of elongated structural elements or a primary preform can easily be achieved by using a matrix with openings corresponding to the two-dimensional periodic structure. The elongated structural elements or the primary preform are inserted for example into two matrices that fix the elongated structural elements or the primary preform at both ends. Hence, the complete structure can easily be assembled and inserted into an overcladding tube.

Each matrix is preferably formed as a disk that may be held at defined positions within the overcladding tube, e.g. by means of inner flanges.

Further each matrix preferably comprises openings that allow transferring of the grain.

The matrix is preferably made of material that corresponds to the grain so that it will melt together with the overcladding material.

In order to close gaps and holes and to obtain a higher material density a vibration, preferably a high frequency vibration may be applied.

Structural elements may be tubes and rods or tube-and-rod combinations. Tubes may be used if a void shall be created that corresponds to the inner space of the tube. Solid rods may be used with a selected refractive index in order to create corresponding solid lines in the fibres. However rods may also be removed during or after the heating process stepwise or completely after the grain is molten in order to create an elongated void, which is also a structural element in the preform and the fibre. Using removable rods, which are removed, prevents the structural elements from collapsing during the heating process.

In order to prevent collapsing a coolant may also be transferred through the tubular structural elements during the process of melting the grain. Prevention of collapsing may also be achieved by exposing the interior of the tubular structural elements to a pressure during the process of melting the grain.

BRIEF DESCRIPTION OF THE DRAWINGS

Some of the objects and advantages of the present invention have been stated, others will appear when the following description is considered together with the accompanying drawings, in which:

FIG. 1 shows a primary preform 11 having a first primary axis x1;

FIG. 2 shows a thin-walled silica tube 12, having a first primary axis x2, with a conical closure 125 at its lower end that, according to the inventive method, is used as overcladding tube 12;

FIG. 3 shows the primary preform 11 held in a centrally inserted position within the overcladding tube 12 with said first and second primary axes x1, x2 in substantial alignment with each other;

FIG. 4 shows an unprocessed secondary preform 1 with the primary preform 11 and the overcladding tube 12 of FIG. 3 with an interior space 15, that is defined by the outer surface 111 of the primary preform 11 and inner surface 120 of the overcladding tube 12, filled with overcladding grain 13;

FIG. 5 shows the secondary preform 1 of FIG. 4 with an adjoiner 3 partially inserted into the overcladding tube 12, holding the primary preform 11 in centralised position and closing and sealing the interior space 1 on its upper side;

FIG. 6 shows a secondary preform 1 with an adjoiner 3 that allows insertion of overcladding grain 13 through a channel 38;

FIG. 15 shows a sectional view of a preform 1 with two inserted matrices 200 that hold tubular and solid elongated structural elements 1201, 1201' and a centralised removable rod 1205 arranged in a two-dimensional periodic structure within the overcladding tube 12, before heat-processing;

FIG. 16 shows the preform 1 of FIG. 15 after heat-processing and removal of the removable rod 1205 that occupied the core 11' of the preform.

DETAILED DESCRIPTION OF THE PREFERRED EMBODIMENTS

Figure 7:
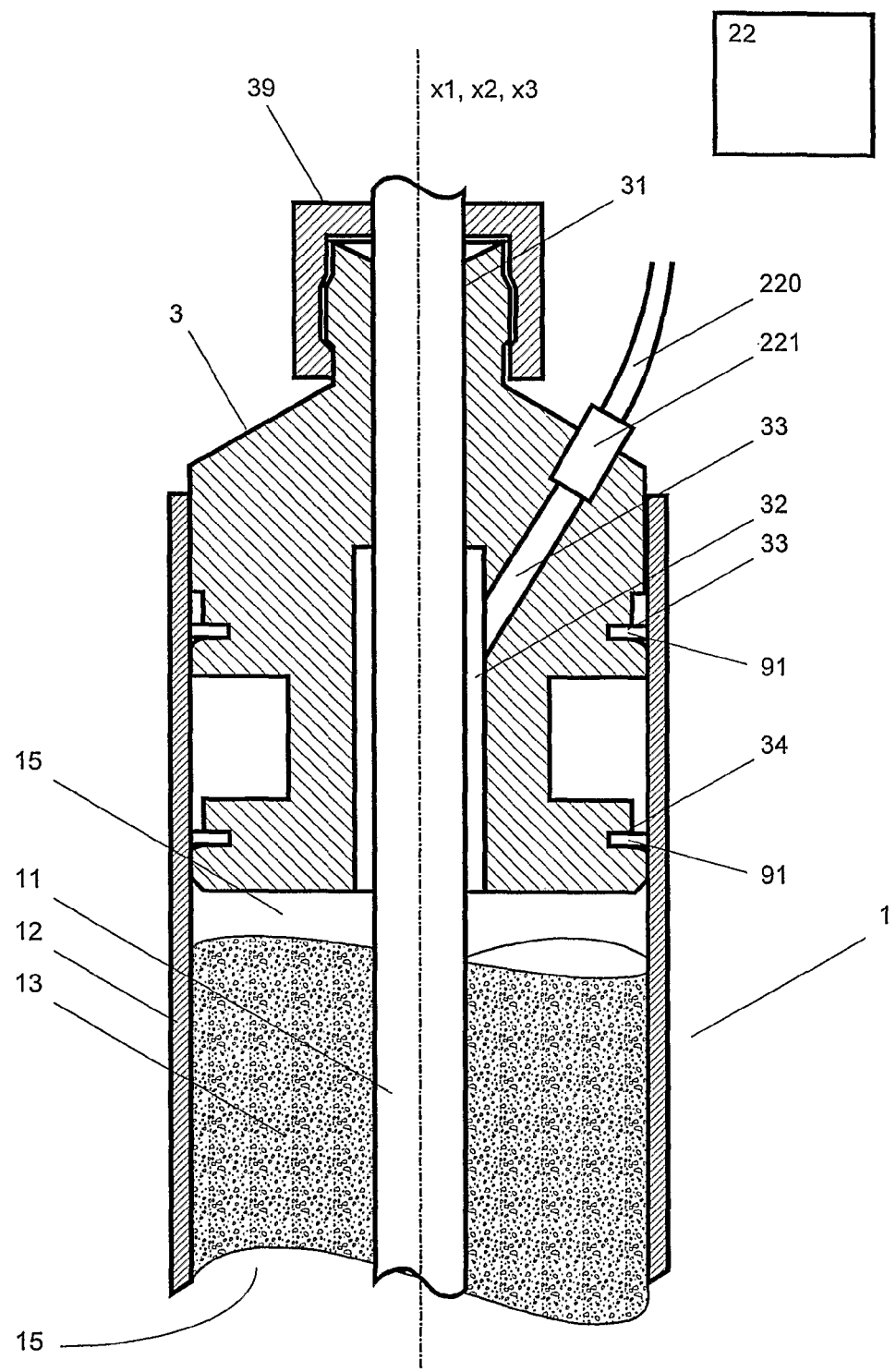
FIG. 7 shows the upper end of secondary preform 1 of FIG. 5 in detail.

FIG. 1 shows a primary preform 11 having a first primary axis x1, an outer diameter d1 and an outer surface 111. Manufacturing of such a preform has been described above.

FIG. 2 shows a thin walled silica tube 12, having a first primary axis x2, an inner diameter d2, a wall thickness d20 and an inner surface 120. The thin walled silica tube 12, which comprises a conical closure 125 at its lower end, is used according to the inventive method as overcladding tube 12. Silica tubes of this kind are available from several manufacturers.

FIG. 3 shows the primary preform 11 held in a centrally inserted position within the overcladding tube 12 with said first and second primary axes x1, x2 in substantial alignment with each other.

The thickness d20 of the circular wall of the overcladding tube 12 is for example ten times smaller than its inner diameter d2. However the ratio of said diameter/thickness d2/d20 may be up to 50 and higher. The ratio d2/d1 of the inner diameter d2 of the overcladding tube 12 and the outer diameter d1 of the primary preform 11 is for example in the range of 1.5 up to 5 and more.

Hence, the volume of the interior space 15, that is defined by the outer surface 111 of the primary preform 11 and inner surface 120 of the overcladding tube 12 is relatively large, i.e. several times larger than the volume of the primary preform 11.

FIG. 4 shows an unprocessed secondary preform 1 with the primary preform 11 and the overcladding tube 12 of FIG. 3 with the interior space 15 filled with overcladding grain 13, a pure or doped synthetic silica grain or powder, that is selected according to the desired properties of the fibre during the drawing process or in view of its later performance.

FIGS. 1a, 2a, 3a and 4a show cross-sections of the primary preform 11, the overcladding tube 12 and the overcladding grain 13 along line s in FIGS. 1 to 4.

FIG. 5 shows the secondary preform 1 of FIG. 4 with an adjoiner 3 inserted into the overcladding tube 12, holding the primary preform 11 in centralised position and closing and sealing the interior space 1 on the upper side. In this embodiment of the invention the overcladding grain 13 had been inserted into the interior space 15 before the adjoiner 3 has been mounted.

FIG. 6 shows the primary preform 11 and the overcladding tube 12 aligned and covered by means of an adjoiner 3, that comprises a channel 38, through which the overcladding grain 13 can be inserted.

The adjoiners 3 shown in FIGS. 5 and 6, which have a first primary axis x3, further comprise evacuation channels 32, 33 through which, by means of a vacuum pump 22, the secondary preform 1, that is filled with overcladding grain 13, can be evacuated.

FIGS. 5 and 6 further show a heat supply or furnace 23, which allows heating of the secondary preform 1 at its lower end for example to temperatures in the range of to 2100° C. to 2350° C. Due to the thermal energy provided by the furnace 23 and due to the established difference of pressures that are present in and outside the secondary preform 1, the overcladding tube 12 will collapse and press the molten overcladding grain 13 onto the primary preform 11. Thus, the overcladding material of the overcladding tube 12 and the overcladding grain 13 will form a practically homogeneous layer that adjoins the primary preform.

FIGS. 5a and 6a symbolically show a cross-section of the secondary preform 1 after performing the melting process.

Fusing of the secondary preform 1 and fibre drawing can be performed simultaneously. However it is also possible to process the secondary preform 1 completely before the fibre is drawn.

FIG. 6 shows in a sectional view of the upper end of secondary preform 1 of FIG. 5 in detail. The adjoiner 3, which is inserted into the overcladding tube 12, comprises two peripheral circular grooves with sealing elements, e.g. o-rings, that tightly adjoin and seal the inner surface 120 of the overcladding tube 12 so that the interior space 15 that is limited by the adjoiner 3, the outer surface 111 of the primary preform 11 and the inner surface 120 of the overcladding tube 12 and its closure 125 at the lower end can be evacuated. The evacuation can be performed through evacuation channels 32 and 33 provided in the adjoiner 3 and through a tube 220 that connects the adjoiner 3 with the vacuum pump 22. The tube 220 is connected to the adjoiner 3 by means of a valve 221 that can be closed after the evacuation process has been performed. Instead, for generating a condition of reduced pressure, a gas could be supplied to a corresponding channel in the adjoiner 3, as described in [2].

Figure 8:
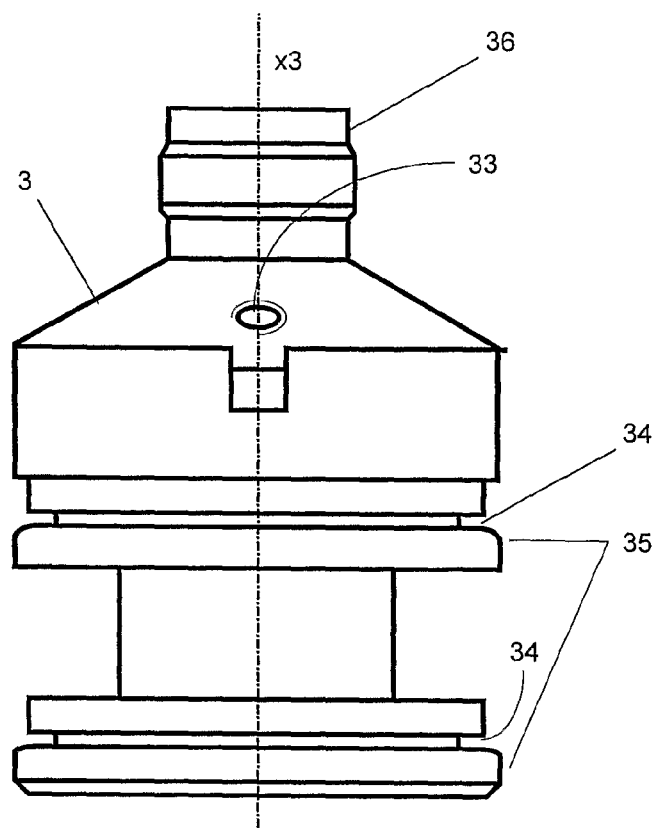
FIG. 8 shows the adjoiner 3 used for the secondary preform 1 of FIG. 4.
Figure 9:
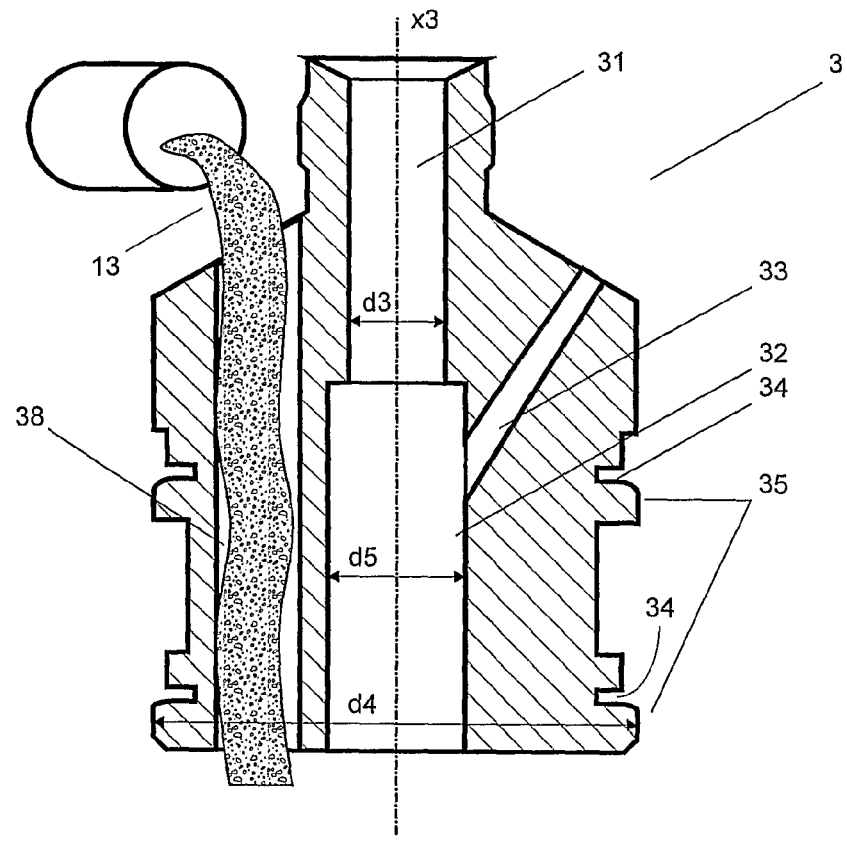
FIG. 9 shows a sectional view of the adjoiner 3 of FIG. 6, with the channel 38 provided for the insertion of overcladding grain 13.

The adjoiner 3 shown in FIGS. 7 to 9 further comprises, coaxially aligned with the first primary axis x3, a cylindrical opening 31 with a diameter d3 that corresponds to the outer diameter d1 of the primary preform 11 and, coaxially aligned with the first primary axis x3, two cylindrical segments 35 with a diameter d4 that corresponds to the inner diameter d2 of the overcladding tube 12. The adjoiner 3 can therefore be inserted into the cladding tube 12 so that the cylindrical segments 35 adjoin the inner surface 120 of the overcladding tube 12 and the primary preform 11 is inserted into the cylindrical opening 31 which leads to an end piece 36 that either is closed or can be closed by means of a sealing cap 39.

For sealing the adjoiner towards the inner surface 120 of the overcladding tube 12, two grooves, adjoining the cylindrical segments 35, are provided, in which sealing elements 91 are inserted.

FIG. 8 shows the adjoiner 3 used for the secondary preform 1 of FIG. 4 and FIG. 9 shows a sectional view of the adjoiner 3 of FIG. 7, with the channel 38 provided for the insertion of overcladding grain 13. In FIG. 9 it is further shown that the first evacuation channel 32 is arranged concentrically to the primary axis x3 of the adjoiner 3 with a diameter d5 that is significantly larger than the diameter d3 of the adjoining cylindrical opening 31.

Figure 10:
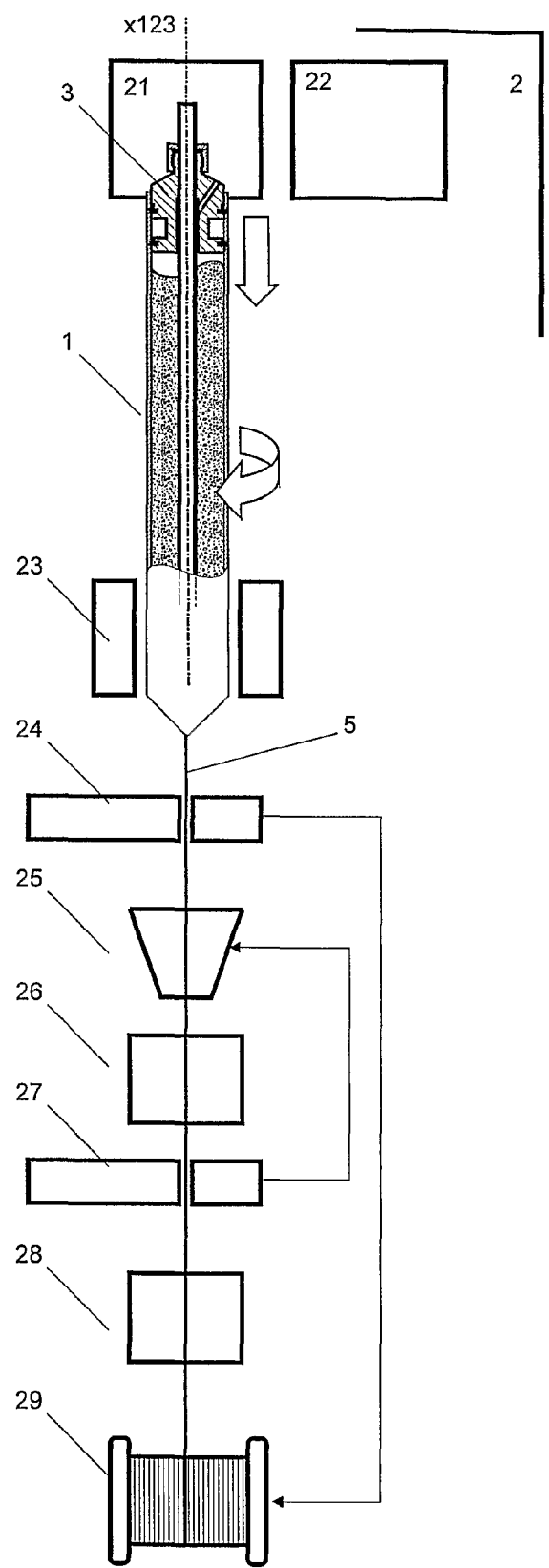
FIG. 10 shows an apparatus used for drawing an optical fibre from the secondary preform 1 of FIG. 5.

FIG. 10 shows an apparatus used for drawing an optical fibre 5 from the secondary preform 1 of FIG. 5. Once the secondary preform 1 is heated to its melting point and a fibre 5 has been pulled, an angular area called the neck-down is formed. A single optical fibre 5 emerges from the preform in a semi-molten state and passes through a diameter monitor 24. The optical fibre 5 continues to be pulled downward and passes through a coating applicator 25 that applies a coating to protect the optical fibre 5. The optical fibre 5 also passes through other units 26, 27 that cure the optical coating and monitor the overall diameter after the coating has been applied. The optical fibre 5 then encounters a spinning apparatus 28 which may comprise a roller that imparts a spin into the optical fibre. The optical fibre 25 then eventually encounters a series of rollers (not shown) pulling the fibre before the optical fibre is then wrapped around a drum or spool 29. The secondary preform 1 is mounted in a holding device 21, which allows controlled vertical movement along and preferably rotation around its axis x123. Furthermore the holding device 21 may be designed to apply a vibration onto the secondary preform in order to condense the overcladding grain 13 provided in the interior space 15.

Figure 11:
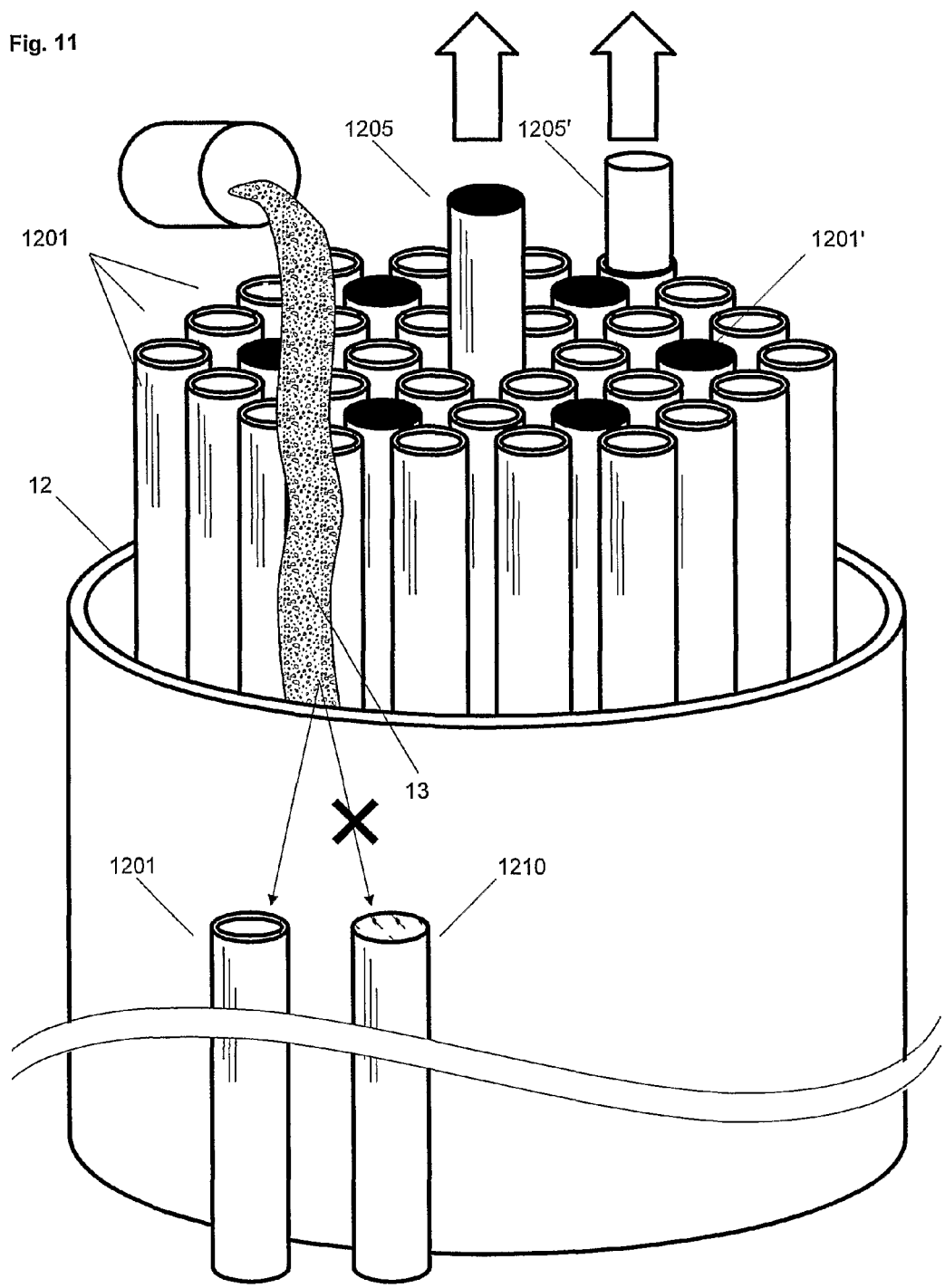
FIG. 11 shows tubular and solid elongated structural elements 1201, 1201' being arranged in a two-dimensional periodic structure within an overcladding tube 12 that is filled with overcladding grain 13 in order to create a preform 1 designed for drawing Photonic Crystal Fibres.

FIG. 11 shows tubular and solid elongated structural elements 1201, 1201' being arranged in a two-dimensional periodic structure within an overcladding tube 12 that is filled with overcladding grain 13 in order to create a preform 1 designed for drawing Photonic Crystal Fibres. The two-dimensional periodic structure is selected to apply the photonic band gap (PBG) effect in the Photonic Crystal Fibre drawn from the preform 1. The definition of the two-dimensional periodic structure is not subject of the present Application. Publications describing these structures have been cited above. However with the present invention, preforms with all kinds of structures can easily and with low costs be realised, since the interior space between the elongated structural elements 1201, 1201' and the overcladding tube 12 is filled with a flexible medium, namely grain 13.

As a consequence relatively thin walled tubes, preferably of a standard size, can be selected as elongated structural elements 1201, that will not be deformed or collapse during the heating process. However, as shown in FIG. 11, removable rods 1205', which are removed after the heating process, can be used to keep the interior of the tubular elongated structural elements 1201 in correct shape. Further, a removable rod 1205 can be used without a tubular elongated structural element to keep an elongated empty space or void, i.e. free from overcladding material 13, 130. After the preform 1 is processed the removable rod 1205 is removed. In FIG. 11 a removable rod 1205 is used as a space holder for the empty or gas filled core in which the light will be guided.

The two-dimensional periodic structure applied in the preform 1 of FIG. 11 comprises six overlapping cells, each comprising six peripheral and one central elongated structural element 1201, 1201. The peripheral elements 1201 are tubular intended for crating elongated voids and the central elements 1201' are solid or full-bodied cylinders of a material with a refractive index that differs from the refractive index of the cladding material.

Figure 12:
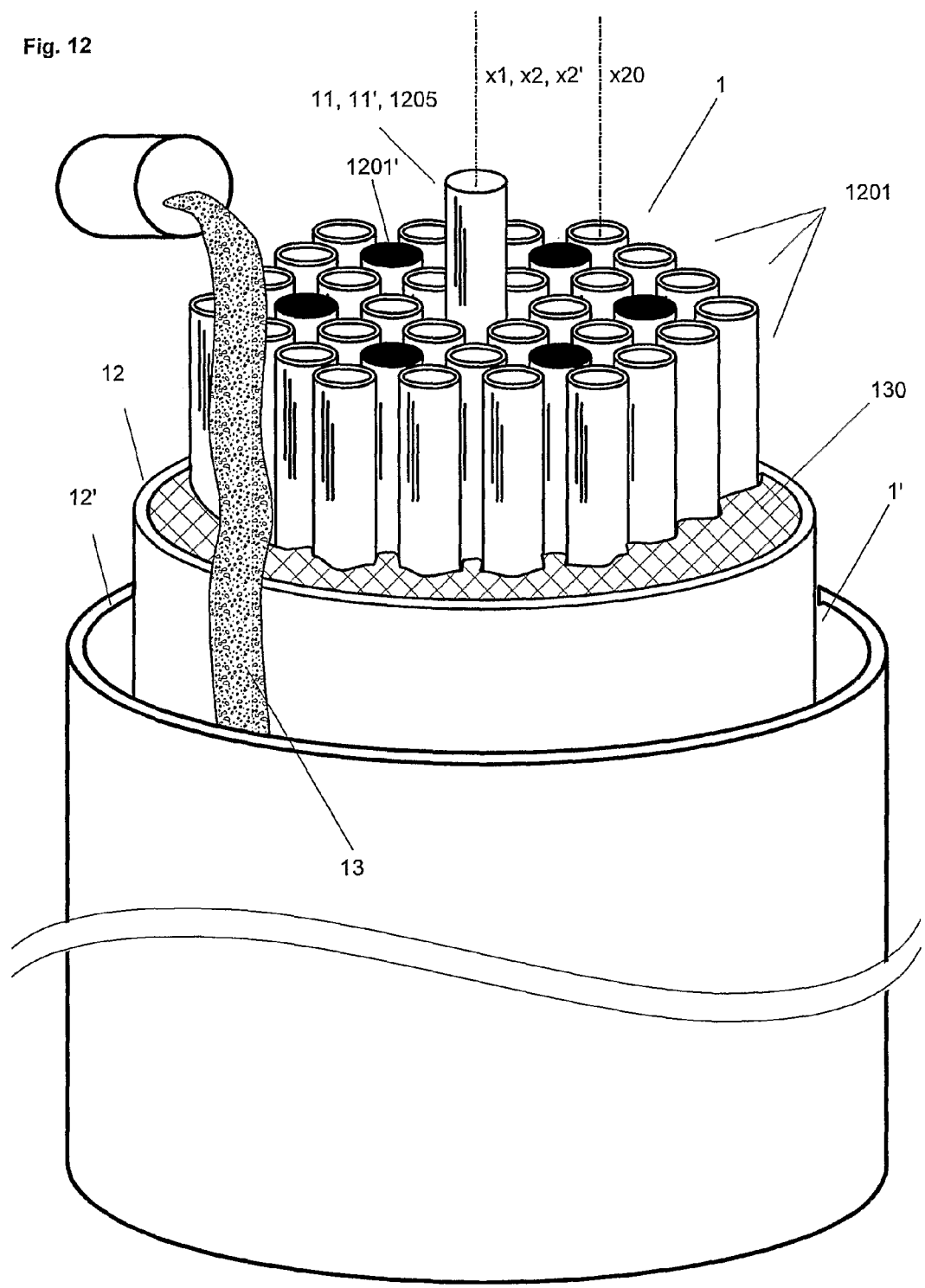
FIG. 12 shows the heat-processed preform 1 of FIG. 11 inserted into a further overcladding tube 12' that is filled with overcladding grain 13 in order to create a larger preform 1.

FIG. 12 shows the heat-processed preform 1 of FIG. 11 inserted into a further overcladding tube 12' that is filled with overcladding grain 13 in order to create a larger preform 1. With this method not only primary PCF-preforms, but secondary and ternary performs, etc., can easily be produced. This is based on the fact that the two-dimensional periodic structure does not need to extend over the complete cross section of the preform or the Photonic Crystal Fibre respectively. The preform 1 represents a primary preform and is processed as described above (see FIGS. 1-4).

Figure 13:
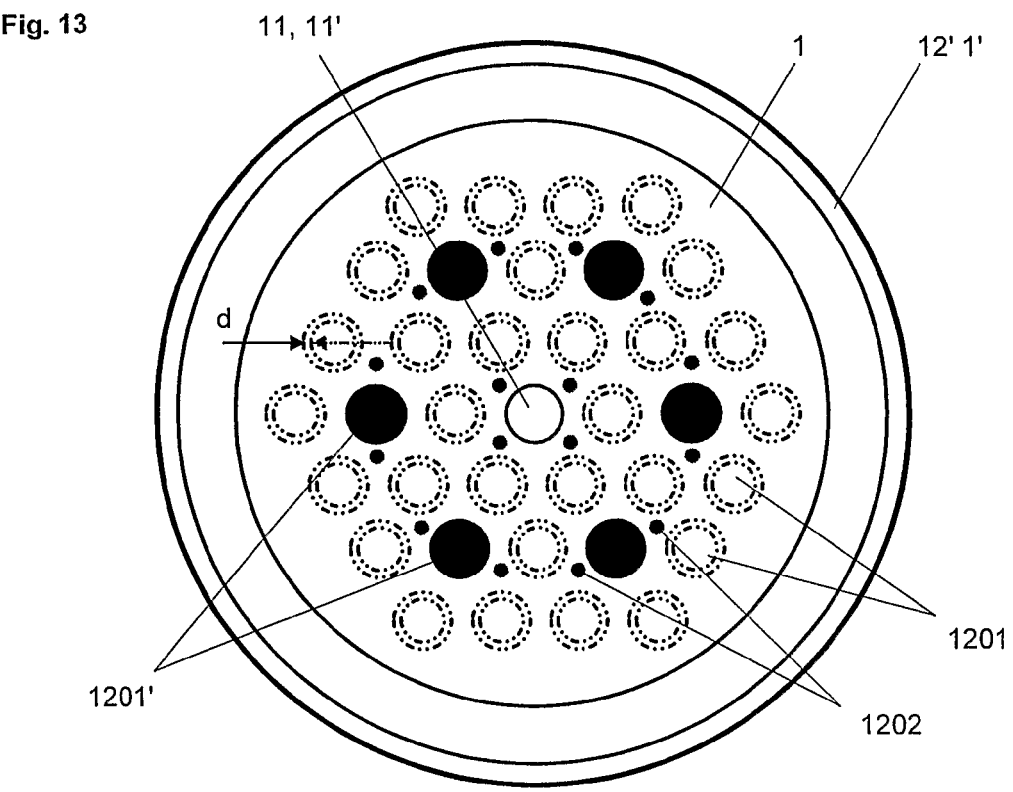
FIG. 13 shows the arrangement of FIG. 13 from the top.

FIG. 13 shows the arrangement of FIG. 13 from the top with solid and peripherally molten tubular elements 1201, 1201'. The removable rod 1205 in the core region and removable rods 1205' in the tubular elements 1201 have been removed leaving a hollow core and elongated side voids. Since the invention can be applied with any two-dimensional periodic structure additional secondary structural elements 1202 were added to the preform 1 as an example.

Figure 14:
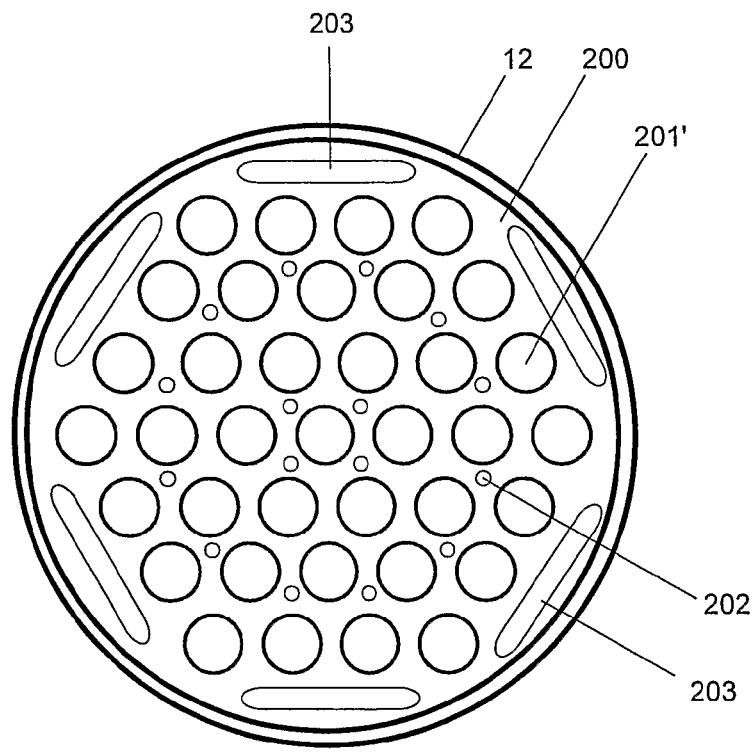
FIG. 14 shows a glass matrix 200 designed to receive and hold the structural elements 1201, 1201' in a two-dimensional periodic structure.

FIG. 14 shows a glass matrix 200 that has been designed to receive and hold the structural elements 1201, 1201', 1202, 1205, 1205' in a two-dimensional periodic structure. The glass matrix 200, which has the form of a disc or wafer, comprises openings 201, 202 through which the structural elements 1201, 1201' can be inserted. Further openings 203 are provided through which the grain 1 can be passed through. With these matrices 200 the preforms can easily be assembled. If the matrices 200 consist of cladding material 13, then the matrices 200 will be transformed during the heat-processing into a section of the cladding layer in the same way as the grain 13 is.

The production of matrices 200, however, can be done with minimal effort.

FIG. 15 shows a sectional view of a preform 1 with two inserted matrices 200 that hold tubular and solid elongated structural elements 1201, 1201' and a centralised removable rod 1205 arranged in a two-dimensional periodic structure within the overcladding tube 12, before heat-processing.

FIG. 16 shows the preform 1 of FIG. 15 after heat-processing and removal of the removable rod 1205 that occupied the hollow core 11' of the preform 1. Instead of an empty core 11' a solid rod 1201' can be provided that represents a solid core 11. As a comparison, a tubular structural element 1201 preferably filled with a removable rod 1205', a centralised solid rod 1201', or a centralised removable rod 1205 serve as a replacement for the primary preform 11 shown in FIG. 1.

Figure 17:
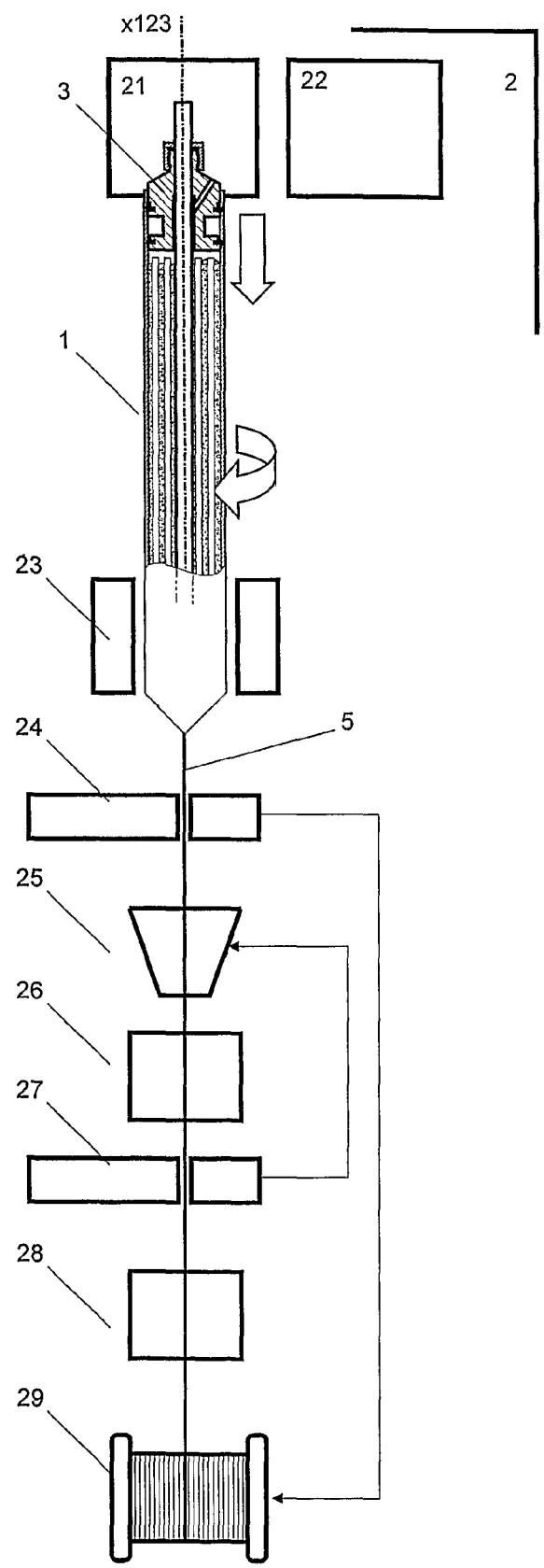
FIG. 17 shows an apparatus used for drawing a Photonic Crystal Fibre from the preform 1 of FIG. 16.

FIG. 17 shows an apparatus used for drawing a Photonic Crystal Fibre 5 from the preform 1 of FIG. 16.

What has been described above is merely illustrative of the application of the principles of the present invention. Other arrangements can be implemented by those skilled in the art without departing from the spirit and scope of protection of the present invention. Dimensions of the primary preform 11 and the overcladding tube 12 or the elongated structural elements 1201, 1201', 1202, 1205, 1205' can be selected in a wide range as well as the granularity of the overcladding grain or powder 13 and the refractive indices and dopants of the used materials. The diameter of the filled or empty core element 11, 11' is typically a multiple of the diameter of the remaining structural elements 1201, 1201', 1202. The removable rods 1205, 1205' are selected with a suitable thermal expansion so that they can easily be removed, when the preform is cooled down. The removable rods 1205, 1205' may for example consist of graphite. Hence, removing rods or canes from vitrified silica can easily be done if a material with a thermal expansion coefficient is used, which is larger than the thermal expansion coefficient of glass. During a cooling process e.g. a graphite rod will retract or shrink stronger than glass so that will no adhesion remain to the glass. Hence, with removable rods, preforms with complex structures comprising numerous elongated void elements can easily be created.

It is important to note that the forms dimensions of all structural elements are not limited to the examples defined above, but can be extended to all forms disclosed in the state of the art. Further, as shown in FIG. 11, structural elements 1210 may be used that are covered or sealed thus preventing the overcladding grain 13 from entering. The structural elements 1210 may be covered by a cap or sealed by means of a glass layer, which for example can be molten, after the overcladding grain 13 has been added. Materials are selected according to the manufacturing parameters and properties desired for the fabricated optical fibre. The channels and openings 31, 32, 33, 38 and sealing means 34, 39, 91 for the adjoiner 3 can be designed in various ways. The closure 125 at the lower end of the overcladding tube 12 can have forms that significantly differ from a conical form. However the closure 125 and the lower end of the primary preform are preferably matched in order to facilitate alignment. Conditions for drawing a fibre can be applied and optimised in a known manner (see e.g. [5], EP 1 384 700 A1), so that optimal operating parameters, such as furnace temperature and drawing speed, can be found. Hence, such operating parameters are not limited by values mentioned above.

REFERENCES

[1] Mool C. Gupta, Handbook of PHOTONICS, CRC Press, 1997 Boca Raton, chapter 10.7, pages 445-449
[2] U.S. Pat. No. 6,519,974 B1
[3] U.S. Pat. No. 2,980,957
[4] U.S. Pat. No. 4,820,322
[5] EP 1 384 700 A1
[6] U.S. Pat. No. 6,047,568
[7] U.S. Pat. No. 6,334,338
[8] U.S. Pat. No. 6,845,204
[9] U.S. Pat. No. 6,625,364

The invention claimed is:

1. A method for fabricating a Photonic Crystal Fiber preform, comprising the steps of:
    inserting at least one holding matrix into an overcladding tube having an inner surface, the holding matrix having a solid structure and comprising a plurality of openings spaced apart from one another;
    inserting a plurality of elongated structural elements into the spaced apart openings in the holding matrix that has been inserted into the overcladding tube, each elongated structural element having an outer surface and being arranged in at least substantially two-dimensionally periodic structure, the outer surfaces and inner surface defining an interior space limited at a first end of the overcladding tube by a closure;
    holding the structural elements longitudinally substantially-parallel to the overcladding tube, utilizing the holding matrix;
    supplying overcladding grain into the interior space, the holding matrix being made from the same material as the overcladding grain;
    limiting the interior space at a second end of the overcladding tube by an adjoiner, wherein the plurality of structural elements, the overcladding tube, the closure, the overcladding grain, and the adjoiner form an unprocessed preform;
    generating a reduced pressure within the interior space; and
    heating at least the bottom portion of the unprocessed preform at sufficiently high temperature to melt the grain for obtaining a processed preform.

2. A method for fabricating a Photonic Crystal Fiber preform as claimed in claim 1, wherein the step of heating is performed on the entire length of the unprocessed preform to form the processed preform.

3. A method for fabricating a Photonic Crystal Fiber preform as claimed in claim 1, wherein at least one of the structural elements is a tube.

4. A method for fabricating a Photonic Crystal Fiber preform as claimed in claim 3, wherein at least one rod is contained within the at least one tube, the at least one rod comprising material having thermal expansion coefficient larger than the thermal expansion coefficient of glass.

5. A method for fabricating a Photonic Crystal Fiber preform as claimed in claim 1, wherein the rod comprises material having thermal expansion coefficient larger than the thermal expansion coefficient of glass.

6. A method for fabricating a Photonic Crystal Fiber preform as claimed in claim 1, wherein the rod comprises carbon material.

7. A method for fabricating a Photonic Crystal Fiber preform as claimed in claim 1, wherein the step of removing the rod comprises removing the rod completely after the grain has been melted.

8. A method for fabricating a Photonic Crystal Fiber preform as claimed in claim 1, wherein the step of removing the rod comprises of removing the rod incrementally while at least a portion of the grain is in a molten state.

9. A method for fabricating a Photonic Crystal Fiber preform as claimed in claim 1, wherein the overcladding grain consists of particles with a small diameter, comprising a doped synthetic silica grain.

10. A method for fabricating a Photonic Crystal Fiber preform as claimed in claim 1, wherein the temperature used in the step of heating is selected in the range of 2100° C. to 2350° C.

11. A method for fabricating a Photonic Crystal Fiber preform as claimed in claim 1, wherein at least one of the plurality of structural elements comprises a tube, and the method further comprises the step of passing a coolant through the tube during the step of heating.

12. A method for fabricating a Photonic Crystal Fiber preform as claimed in claim 1, wherein at least one of the plurality of structural elements comprises a tube, and the method further comprises the step of introducing high pressure into the tube during the step of heating.

13. An unprocessed preform for fabricating a Photonic Crystal Fiber, comprising:
    a plurality of elongated structural elements, each having an outer surface and being arranged in an at least substantially two-dimensionally periodic structure, within an overcladding tube having an inner surface, the outer surfaces and inner surface defining an interior space limited at a first end of the overcladding tube by a closure;
    at least one holding matrix disposed within the overcladding tube, the holding matrix comprising a solid structure having a plurality of spaced apart openings;
    the structural elements being arranged longitudinally parallel to the overcladding tube, at least one of the structural elements being disposed within one of the openings of the holding matrix;
    the interior space containing overcladding grain, the overcladding grain being made from the same material of the holding matrix;
    the interior space being limited at a second end of the overcladding tube by an adjoiner; and
    wherein the plurality of structural elements, the overcladding tube, the closure and the adjoiner form an unprocessed preform.

14. Preform as claimed in claim 13, wherein the interior space is limited at a second end of the overcladding tube by an adjoiner.

15. Preform for fabricating a Photonic Crystal Fiber, comprising:
    an overcladding tube having an inner surface;
    a holding matrix comprising a solid structure with a plurality of spaced apart openings formed therein;
    a plurality of elongated structural elements inserted into the spaced apart openings of the holding matrix, each having an outer surface and being arranged in an at least substantially two-dimensionally periodic structure within the overcladding tube, the outer surface of each elongated structural element being spaced apart from outer surfaces of other structural elements, the outer surfaces and inner surface defining an interior space limited at a first end of the overcladding tube by a closure;

the structural elements being arranged longitudinally parallel to the overcladding tube;

the interior space containing overcladding grain; and the plurality of structural elements and the overcladding tube forming a molten unity that constitutes a processed preform.

16. Preform as claimed in claim 15, wherein the interior space is limited at a second end of the overcladding tube by an adjoiner.

17. A method for fabricating a photonic crystal fiber, comprising the steps of:
    inserting at least one holding matrix into an overcladding tube having an inner surface, said holding matrix having a solid structure and comprising a plurality of spaced apart openings;
    inserting a plurality of elongated structural elements into the holding matrix that has been inserted into said overcladding tube, each elongated structural element having an outer surface and being arranged in at least substantially two-dimensionally periodic structure, the outer surfaces and inner surface defining an interior space limited at a first end of the overcladding tube by a closure;
    holding the structural elements longitudinally substantially parallel to the overcladding tube, utilizing said holding matrix;
    supplying overcladding grain into the interior space, the overcladding grain being made from the same material of the holding matrix;
    limiting the interior space at a second end of the overcladding tube by an adjoiner, wherein the plurality of structural elements, the overcladding tube, the closure, the overcladding grain, and the adjoiner form an unprocessed preform;
    generating a reduced pressure within the interior space; and
    heating at least the bottom portion of the unprocessed preform and simultaneously drawing a photonic crystal fiber therefrom.

18. A method for fabricating a photonic crystal fiber as claimed in claim 17, wherein the closure is conical.

19. A method for fabricating a photonic crystal fiber, comprising the steps of:
    inserting into an overcladding tube having an inner surface, a plurality of elongated structural elements, each having an outer surface and being arranged in at least substantially two-dimensionally periodic structure, the outer surfaces and inner surface defining an interior space limited at a first end of the overcladding tube by a conical closure;
    inserting a holding matrix into the overcladding tube wherein at least one of the structural elements is disposed in one of the holding matrix openings; and
    holding the structural elements longitudinally substantially parallel to the overcladding tube;
    supplying overcladding grain into the interior space;
    limiting the interior space at a second end of the overcladding tube by an adjoiner, wherein the plurality of structural elements, the overcladding tube, the closure, the overcladding grain, and the adjoiner form an unprocessed preform;
    generating a reduced pressure within the interior space; and
    heating at least the bottom portion of the unprocessed preform and simultaneously drawing a photonic crystal fiber therefrom.

20. A method for fabricating a Photonic Crystal Fiber preform, comprising the steps of:
    inserting into a holding matrix within an overcladding tube having an inner surface a plurality of elongated structural elements, each having an outer surface, and being arranged in at least substantially two-dimensionally periodic structure, the outer surface of each elongated structural element being spaced apart from outer surfaces of other structural elements, the outer surfaces and inner surface defining an interior space limited at a first end of the overcladding tube by a conical closure;
    holding the structural elements longitudinally substantially parallel to the overcladding tube;
    supplying overcladding grain into the interior space;
    limiting the interior space at a second end of the overcladding tube by an adjoiner, wherein the plurality of structural elements, the overcladding tube, the closure, the overcladding grain, and the adjoiner form an unprocessed preform;
    generating a reduced pressure within the interior space; and
    heating at least the bottom portion of the unprocessed preform at sufficiently high temperature to melt the grain for obtaining a processed preform.

* * * * *